Patented June 6, 1933

1,912,895

UNITED STATES PATENT OFFICE

FRITZ GÖSSEL, OF FRANKFORT-ON-THE-MAIN, GERMANY

PROCESS FOR CONVERTING SOYA BEANS AND THE LIKE SEEDS INTO A CONDITION SUITABLE FOR NUTRITION

No Drawing. Application filed December 23, 1930, Serial No. 504,424, and in Germany January 10, 1930.

Various processes for treating pulse or other edible seeds such as soya beans are already known, the object of which is to convert the same into a condition suitable for nutritive purposes by removing the substances of undesirable taste or constituents forming or giving rise to the same, originally present. These treatments are based in part on a roasting process and in part on extraction with dilute alkalies or the like. Any success which may attend these treatments is always only obtainable at the expense of important constituents, the very important accompanying substances, for example, being destroyed and biologically valuable proteins denatured or partially removed from the beans. The recognition of this fact is not new. Thus it has already been proposed to effect an improvement in taste, particularly of soya beans, by causing steam to react with the same. The desired effect was presumed to be due to the dissolving influence of the steam.

Extensive research which I have conducted has shown, however, that the actual result obtained is due only to the influence of the temperatures, to which the material is subjected and that the steam in this case merely acts as a medium for transmitting the heat. I have found that, when employing heat transmitting agents other than steam, at least the same effect and sometimes even a more favourable effect is obtained. Thus I have ascertained that, on the one hand, air and gases and, on the other hand, liquids and easily fusible solid substances can be very satisfactorily employed as heat transmitting media.

It is obvious that the final result of the treatment of edible seeds such as soya beans will be the more valuable, the more thorough the removal of the substances of undesirable taste or the more thorough the destruction of the constituents forming or giving rise to the same and the less the valuable constituents of the seeds are reduced thereby and the more readily and the more uniformly the action on the material proceeds.

In consideration of the foregoing it is obviously impracticable to effect the treatment of the material while at rest and particularly when the seeds are superimposed in layers, as has hitherto been the case. The steam, which is caused to react with the material, requires a certain time to force its way through the layers of stationary seeds and to raise the latter all uniformly to the required temperature. The seeds nearest to the point of introduction of the steam are subjected, during the whole treatment, to considerable heat, which may have a detrimental effect on the proteins and vitamines contained in the seeds. In the light of scientific knowledge of today it is very important, however, that these substances should be retained.

According to the present invention the improved process for converting edible seeds such as soya beans, which contain substances having an undesirable taste and/or smell or constituents forming or giving rise to the same, into a favourable condition for nutritive purposes by heating the same, is characterized in that the material is subjected to a heat treatment, with or without a mechanical pretreatment such as the husking of the bean, and whilst keeping the individual particles of the material separate from one another in the heating liquid, for example by subjecting the material to movement, by employing inert gases to agitate the liquid. Preferably, inert liquids as well as inert readily fusible solids are used as heat transmitting agents. In the case of inert liquids and fused solids sufficient movement of the material is obtained by its submersion therein and its subsequent rise to the surface. The inert gas or liquid serves to prevent oxidation of the constituents of the beans. Examples of suitable liquids are water, oils, mineral oils or the like, and examples of suitable solids are fats of vegetable, animal or mineral origin.

An advantageous method of procedure is to introduce the seeds, contained in suitable vessels, into the hot liquid. The vessels must be provided with openings of such a size and number as to allow of an extremely rapid entry of the liquid as well as discharge of the same after the end of the treatment.

The proportion of seeds to liquid is preferably so selected that the liquid is subjected to as little cooling as possible on the introduction of the seeds so that they can thereafter be again very rapidly raised to the required temperature, e. g. about 95 to 100° C. The treatment is completed within a few minutes. With a properly conducted operation the reaction can be completed in about 10 minutes from the introduction of the seeds into the liquid until their subsequent removal from the vessels. The seeds can then be freed from the adhering liquid by centrifuging in known manner, and, if necessary, be subsequently dried at temperatures preferably below 100° C. When employing oil and the like, a reaction period of only 5 minutes is sufficient and a subsequent drying process is not necessary. If water is employed as the heat transmitting agent the absorption of the water by the seeds can be diminished, either by providing them with a water repellent coating, for example a thin layer of fat or oil, for which purpose about 0.5% of vegetable or mineral oil (paraffin oil) is sufficient, or by subjecting them to a short pre-treatment with formaldehyde or again by adding to the water suitable mixtures (about 2%) for diminishing the swelling properties of the seed husk, for example calcium chloride, sodium chloride, calcium sulphate, etc.

The use as heat transmitting agents of liquid and easily fusible media as above described offers the important advantage over all known processes, that it enables uniform heating of the seeds to the temperature required for the destruction of the substances of undesirable taste or the constituents forming or giving rise to the same, to be attained whilst preserving their valuable constituents to the fullest extent.

Both husked as well as unhusked seeds in a swollen, germinated or natural condition can be employed in all the modifications of this process. By heating in an oil bath to about 100° C. very efficient separation of the husks from the seeds is at the same time effected, so that the drying process, which is otherwise necessary for removing the husks and which, when employing unshelled seeds has to be expressly introduced, is rendered unnecessary.

If the treated seeds are to be used directly or indirectly for dietetic nutrition or for obtaining products of the nature of meat substitutes, the disturbing sugar-like substances are preferably removed by extraction with water. This may be effected before or after heating and even after grinding.

What I claim is:

1. A process for improving soya beans or similar pulse, comprising treating the soya beans or similar pulse with oils or fats at a temperature of approximately 100° C. for a period of approximately five minutes, and then freeing the said beans or pulse from the oils or fats by centrifuging.

2. A process for removing the repulsive taste of soya beans or similar pulse, while preserving in the beans the various nutritive ingredients thereof, which process consists in subjecting the beans to a temperature in the order of that of the boiling point of water within a medium chemically inert to the various ingredients of the beans, and then withdrawing from the substantially uncooked beans substantially all of said inert medium.

3. A process for removing the repulsive taste of soya beans or similar pulse, while preserving in the beans the various nutritive ingredients thereof, which process consists in subjecting the beans to a temperature in the order of that of the boiling point of water within an oleaginous medium liquid at said temperature, and then withdrawing from the substantially uncooked beans substantially all of said inert medium.

4. A process for removing the repulsive taste of soya beans or similar pulse, while preserving in the beans the various nutritive ingredients thereof, which process consists in coating the surfaces of the beans with a substance substantially impervious to the oxygen of the air and inert to the bean and its various constituent elements, conducting a substantially uniform heat through said coating to the interior of the beans, at a temperature in the order of that of the boiling point of water, and then removing the coating from the substantially uncooked beans.

In testimony whereof I hereunto affix my signature this 9th day of December 1930.

FRITZ GÖSSEL.